United States Patent [19]
Egawa et al.

[11] Patent Number: 5,745,694
[45] Date of Patent: Apr. 28, 1998

[54] NETWORK RESOURCE RESERVATION WITH ADMISSION AND LINK CONTROL FUNCTIONS SEPARATED FOR EXPANDABILITY AND HIGH-SPEED OPERATION

[75] Inventors: Takashi Egawa; Makiko Yoshida; Hiroyuki Okazaki, all of Tokyo, Japan

[73] Assignee: NEC Corporation, Japan

[21] Appl. No.: 521,193

[22] Filed: Aug. 30, 1995

[30] Foreign Application Priority Data

Aug. 30, 1994 [JP] Japan ..................................... 6-204081
Jun. 12, 1995 [JP] Japan ..................................... 7-144440

[51] Int. Cl.$^6$ ........................... H04M 11/00; G06F 13/00
[52] U.S. Cl. .................. 395/200.55; 395/200.56; 395/674; 395/675
[58] Field of Search ........................... 395/200.06, 200.2, 395/674, 675, 200.55, 200.56

[56] References Cited

U.S. PATENT DOCUMENTS 5,359,641 10/1994 Schull et al. ........................... 379/106
5,640,595 6/1997 Baugher et al. ...................... 395/830

OTHER PUBLICATIONS

Bellcore's Technical Reference, "TR-TSY-000366", Issue 2, Mar. 1988, pp. 1-1 to 1-5 and 3-12 to 3-33.
Y. Miyao, Network Planning for an Open Era, "A Dimensioning Scheme in ATM Networks," May 1992, pp. 171-175.

Primary Examiner—Krisna Lim
Attorney, Agent, or Firm—Ostrolenk, Faber, Gerb, & Soffen, LLP

[57] ABSTRACT

In a reconfigurable network shared by multiple users, a reservation request is sent from a user who desires to establish a network resource in the network. The request contains indications of a circuit assigned to the user, a network resource desired to be allocated from the resource of the assigned circuit, dates and start and end times of a reservation time span. A reservation system includes an interface connected to the user networks for receiving the request, a first database, a second database for storing resources respectively assigned to the user networks. An admission controller connected to the interface is responsive to a user's request for accessing the first and second databases to verify the availability of the desired resource, and informs the user as to the results of the verification. If the desired resource is available, the data of the request is stored into the first database. As a separate unit, a link control module is provided which is connected to one of the interconnection switches. At the start time of the request, the link control module operates the associated switch to establish the desired network resource, and at the end time of the request, operates the associated switch to clear the established network resource. The admission controller removes the data of the request from the first database at the end time of the request.

23 Claims, 12 Drawing Sheets

FIG. 2A
RESERVATION RQST DATABASE 103

| REQUEST ID | CIRCUIT ID | LINK ID | TIME TO START | | TIME TO END | | BANDWIDTH |
|---|---|---|---|---|---|---|---|
| 1 | 30 | 1, 3, 10, 11 | 8/10 | 10:00 | 8/10 | 13:00 | 45 Mbps |
| 2 | 51 | 3, 4, 6 | 8/10 | 12:00 | 8/10 | 15:45 | 20 Mbps |
| 3 | 23 | 5, 9, 15 | 8/10 | 9:30 | 8/10 | 18:00 | 64 kbps |
| ⋮ | ⋮ | ⋮ | ⋮ | ⋮ | ⋮ | ⋮ | ⋮ |
| | | | | | | | |

FIG. 2B
NETWORK RESOURCE DATABASE 104

104A

| CIRCUIT ID | LINK ID |
|---|---|
| 1 | 15, 17, 20 |
| 2 | 2, 5, 8 |
| 3 | 21, 26, 29 |
| ⋮ | ⋮ |
| | |

104B

| LINK ID | MAXIMUM USABLE BANDWIDTH |
|---|---|
| 1 | 150 Mbps |
| 2 | 150 Mbps |
| 3 | 600 Mbps |
| ⋮ | ⋮ |
| | |

FIG. 2C
CONTROL DATA MEMORY 106

| CIRCUIT ID | BANDWIDTH |
|---|---|
| 4 | 30 Mbps |
| 8 | 384 kbps |
| 12 | 1.5 Mbps |
| ⋮ | ⋮ |
| | |

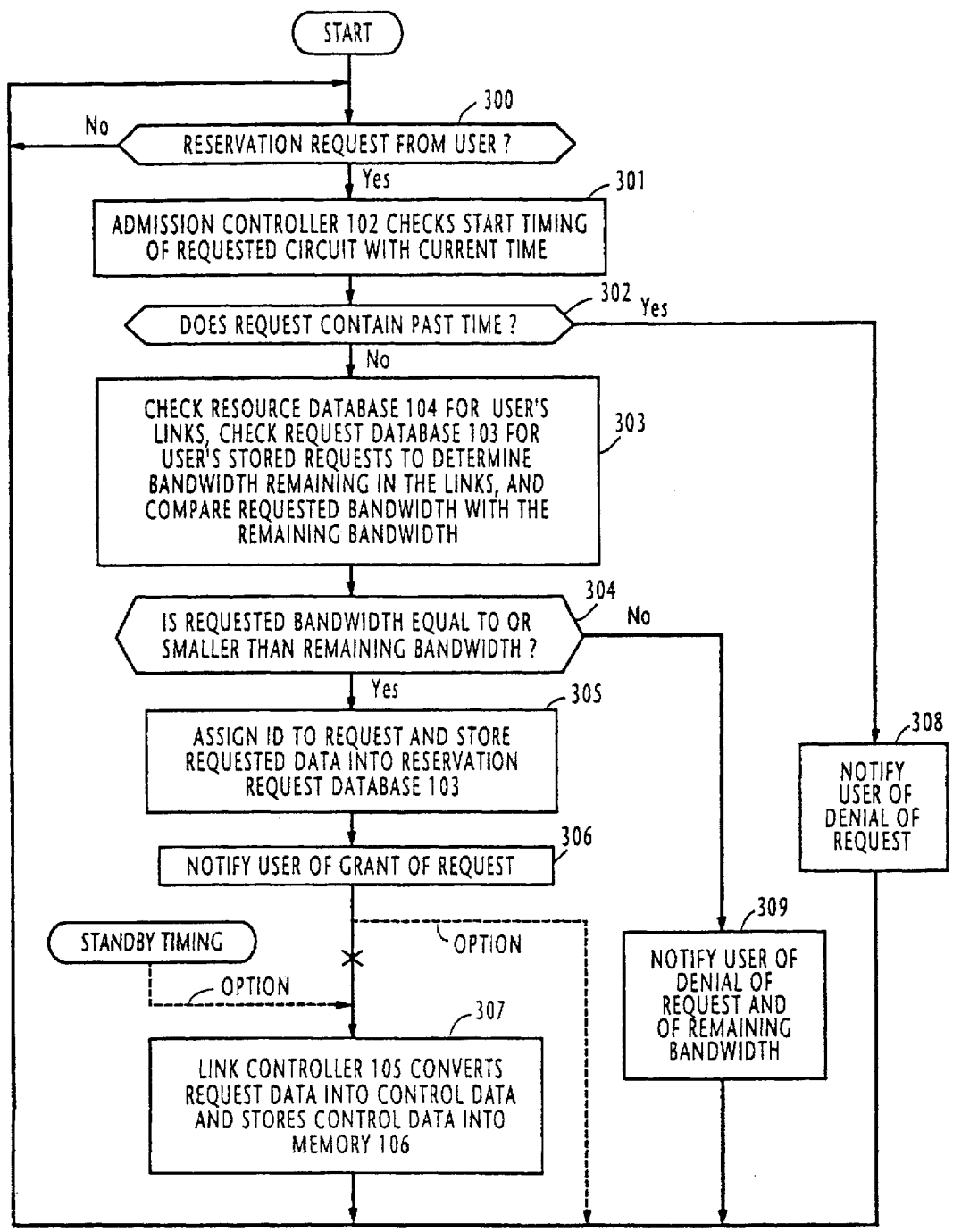

FIG. 5A
RESOURCE ALLOCATION TABLE 400

| LINK ID | 8/10 | | | | 8/11 | | |
| --- | --- | --- | --- | --- | --- | --- | --- |
| | 3:00 – | 4:00 – | ------- | 23:00 – | 0:00 – | 1:00 – | ------- |
| 1 | 20 Mbps | 10 Mbps | ------- | 18 Mbps | 40 Mbps | 25 Mbps | ------- |
| 2 | 3 Mbps | 18 Mbps | ------- | 0 | 30 Mbps | 20 Mbps | ------- |
| 3 | 5 Mbps | 15 Mbps | ------- | 70 Mbps | 12 Mbps | 15 Mbps | ------- |

FIG. 5B
RESOURCE ALLOCATION TABLE 400

| LINK ID | TOTAL BANDWIDTH | 8/10 | | | | 8/11 | | |
| --- | --- | --- | --- | --- | --- | --- | --- | --- |
| | | 3:00 – | 4:00 – | ------- | 23:00 – | 0:00 – | 1:00 – | ------- |
| 1 | 150 Mbps | 20 Mbps | 10 Mbps | ------- | 18 Mbps | 40 Mbps | 25 Mbps | ------- |
| 2 | 150 Mbps | 3 Mbps | 18 Mbps | ------- | 0 | 30 Mbps | 20 Mbps | ------- |
| 3 | 600 Mbps | 5 Mbps | 15 Mbps | ------- | 70 Mbps | 12 Mbps | 15 Mbps | ------- |

FIG. 5C
RESOURCE ALLOCATION TABLE 400

| LINK ID | TOTAL BAND-WIDTH | 8/10 | | | 8/11 | |
| --- | --- | --- | --- | --- | --- | --- |
| | | 3:00 – | 4:00 – | ------- | 0:00 – | ------- |
| 1 | 150 Mbps | max/ave 10 M/5 M x 3 | max/ave 1.5 M/64 k x 2 | ------- | ------- | ------- |
| | | max/ave 50 M/10 M x 1 | max/ave 10 M/5 M x 2 | ------- | ------- | ------- |
| | | max/ave 50 M/30 M x 1 | max/ave 50 M/30 M x 1 | ------- | ------- | ------- |
| 2 | 150 Mbps | | | | | |
| 3 | 600 Mbps | | | | | | ial
NETWORK RESOURCE RESERVATION WITH ADMISSION AND LINK CONTROL FUNCTIONS SEPARATED FOR EXPANDABILITY AND HIGH-SPEED OPERATION

BACKGROUND OF THE INVENTION

1. Field of the Invention

The present invention relates to a reconfigurable transmission network shared by multiple users, the transmission network including a plurality of parallel circuits each composed of a series of links interconnected by interconnection switches such as digital cross-connect systems and subscriber line terminators.

2. Description of the Related Art

In a reconfigurable network for interconnecting multiple users through digital cross-connect systems, the users can send requests to the network for additional network resources if desired. The amount of the desired resource is tested for availability. If the resource availability is confirmed, then the network is reconfigured according to the desired amount. As described in a Bellcore's technical reference "TR-TSY-000366" Issue 2, March 1988, pages 1-1 to 1-5 and 3-12 to 3-33, a customer control and management controller is provided to enable Bell Operating Company/ Information Distribution Center customers to remotely reconfigure their special services communications lines using control circuits, CCM software and remotely reconfigurable network terminal equipment. Reservation capabilities are described in the Bellcore's technical reference. Users can send a reservation request indicating a date, start and end times and desired amount of network resource. When a reservation is requested from a user, a verification process is performed to verify the reservation as to the availability of links, and the user is notified of the results of the verification. When the request is verified, the network is reconfigured according to the desired network resource during the entire time requested. All reservation processes are handled at a network controller.

However, important factors of a reservation system are the speed of response and the expandability of the system.

SUMMARY OF THE INVENTION

It is therefore an object of the present invention to provide a resource reservation system which is easily expandable to adapt user's demands and is capable of operating at high speeds for processing user's requests.

According to a broader aspect, the present invention provides a network resource reservation system for a reconfigurable transmission network which comprises a plurality of parallel circuits each comprising a series of links interconnected by one or more interconnection switches. At least one of the links of one of the circuits is commonly assigned to multiple user network. Each user network transmits a reservation request containing data indicating a circuit assigned to the user network, a network resource desired to be allocated from the resource of the assigned circuit, and start and end times of a reservation time span. The network resource reservation system comprises an interface connected to the user networks for receiving the request, a first database, a second database for storing resources respectively assigned to the user networks, and an admission controller connected to the interface. The admission controller is responsive to a reservation request received by the interface for accessing the first and second databases, informing the requesting user network that the request is denied if the desired network resource is greater than an amount remaining in the resource assigned to the requesting user network, or informing the requesting user network of grant of the request and storing the data of the received request into the first database if the desired network resource is equal to or smaller than the amount. The admission controller is responsive to the end time of the request for removing the data of the request from the first database. A link control (execution) module, connected to an associated one of the interconnection switches, is responsive to the start time of the stored request for operating the associated interconnection switch to establish the desired network resource, and responsive to the end time of the request for releasing the associated interconnection switch to clear the established network resource. By the provision of the link control module as a separate unit from the admission controller, expandability and high speed operation of the system are provided.

According to a specific aspect which features the clearing of expired reservation in preference over establishment of a new reservation, the present invention provides a method for making a reservation of network resource by transmitting a request from a user who desires to establish a network resource in a reconfigurable transmission network which comprises a plurality of parallel circuits each comprising a series of links interconnected by one or more interconnection switches, at least one of the links of one of the circuits being commonly assigned to multiple users, the request containing data indicating a circuit assigned to the user, a network resource desired to be allocated from the resource of the assigned circuit, and start and end times of a reservation time span.

According to the method, it is determined, in response to a reservation request from a user, whether or not the network resource desired by the request is available in the circuit assigned to the user. If the desired network resource is determined to be not available, the user is informed of denial of the request and if the desired network resource is determined to be available, the user is informed of grant of the request. When the start time of the request is reached, the interconnection switch associated with the request is operated to establish the desired network resource of the request. The above process is repeated so that a plurality of desired network resources are established for reservation requests of successive arrivals. The interconnection switch associated with a previous request is then operated to clear the established network resource of this request when the end time of this request is reached. The interconnection switch associated with a subsequent request is operated to establish the desired network resource of this request when the start time of this request is reached simultaneously with the end time of the previous request. When the end time of the subsequent request is reached, the associated interconnection switch is released to clear the established network resource of the subsequent request.

According to a further specific aspect which features transactions for memory utilization, the present invention provides a method for making a reservation of network resource by transmitting a request from a user who desires to establish a network resource in a reconfigurable transmission network which comprises a plurality of parallel circuits each comprising a series of links interconnected by one or more interconnection switches, at least one of the links of one of the circuits being commonly assigned to multiple users, the request containing data indicating a circuit assigned to the user, a network resource desired to be allocated from the resource of the assigned circuit, and start and end times of a reservation time span.

According to the method, it is determined, in response to a reservation request from a user, whether or not the network resource desired by the request is available in the circuit assigned to the user. If the desired network resource is determined to be not available, the user is informed of denial of the request, and if the desired network resource is determined to be available, the request is stored into a database and the user is informed of grant of the request. The request stored in the database is used to produce a link control signal which is stored into a memory. When the start time of the request is reached, an interconnection switch associated with the request is operated according to the link control data of the memory and the desired network resource is established. When the end time of the request is reached, the stored request is used again to produce a link control signal and the associated interconnection switch is released according to the link control data to clear the established network resource and the stored request is removed from the database.

According to a still further aspect featuring memory utilization, the present invention provides a method for making a reservation of network resource by transmitting a request from a user who desires to establish a network resource in a reconfigurable transmission network which comprises a plurality of parallel circuits each comprising a series of links interconnected by one or more interconnection switches, at least one of the links of one of the circuits being commonly assigned to multiple users, the request containing data indicating a circuit assigned to the user, a network resource desired to be allocated from the resource of the assigned circuit, and start and end times of a reservation time span. One of the interconnection switches includes a working unit and a spare unit and first and second memories, the working unit initially operating according to data stored in the first memory.

According to the method, it is determined that, in response to a reservation request from a user, whether or not the network resource desired by the request is available in the circuit assigned to the user. If the desired network resource is determined to be not available, the user is informed of denial of the request, and if the desired network resource is determined to be available, the request is stored into a database and the user is informed of grant of the request. The stored request is used to produce a link control signal which is stored into the second memory. When the start time of the stored data is reached, the working unit is operated according to the link control data of the second memory to establish the desired network resource. When the end time of the stored request is reached, the working unit is released according to the link control data of the second memory to clear the established network resource.

BRIEF DESCRIPTION OF THE DRAWINGS

The present invention will be described in further detail with reference to the accompanying drawings, in which:

FIGS. 2A, 2B and 2C show details of a reservation request database, a network resource database, and a control data memory;

FIGS. 3A, 3B, 3C and 3D are flowcharts associated with the embodiment of FIG. 1;

FIGS. 5A, 5B and 5C show details of a resource allocation table used in the embodiment of FIG. 4;

DETAILED DESCRIPTION

Figure 1:
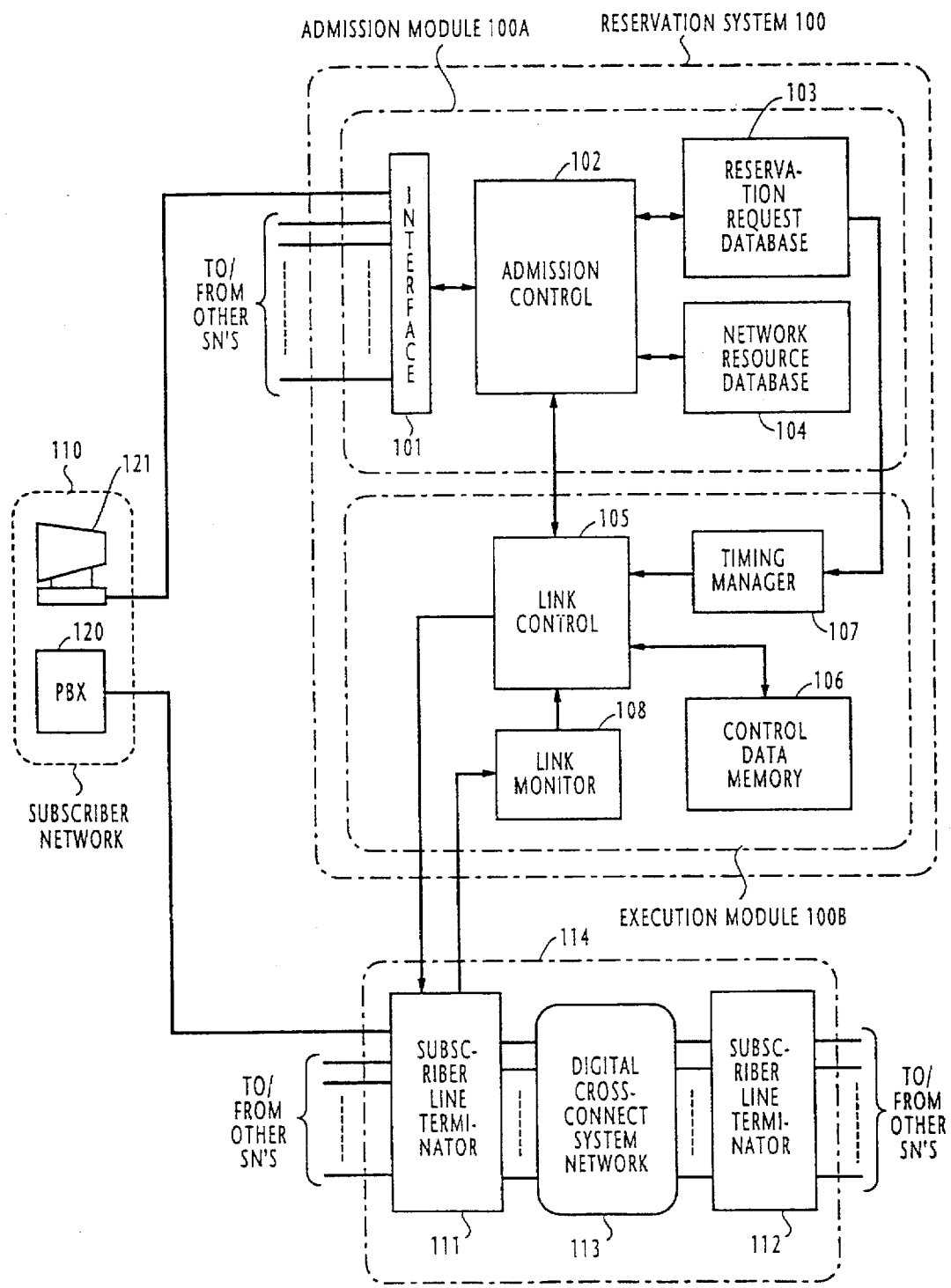
FIG. 1 is a block diagram of a leased-line communication system with a centralized reservation facility for interconnecting user networks according to one embodiment of the present invention.

Referring now to FIG. 1, there is shown a reconfigurable leased-line transmission network for interconnecting subscriber networks with a centralized resource reservation facility constructed according to an embodiment of the present invention. A subscriber network 110 has a private branch exchange (PBX) 120 and a video terminal 121. The PBX 120 provides capability to establish connections between PBX user stations, not shown, and a subscriber line terminator 111 of the reconfigurable leased-line network 114 as well as between the user stations and a public switched telephone network, not shown. The SLT 111 has a provisioning capability to interconnect its input and output terminals on a permanent basis in much the same way as provided by a digital cross-connect system in response to a command signal from a reservation system 100. Other subscriber networks may be terminated at the SLT 111 for sharing the leased-line network 114 with the subscriber network 110. The private leased-line network 114 includes a digital cross-connect system network 113 owned and operated by a service provider. Through the DCS network 113 the output terminals of SLT 111 are connected to a distant SLT 112. Between the subscriber network 110 and a distant subscriber network a dedicated circuit is established through the network 114. Each circuit between these subscriber networks comprises multiple transmission links which are connected in cascade through the network 114. Each of these links contains multiple channels. The number of channels contained in a link and the type of the channels determine the maximum bandwidth (data transmission speed) of the link The subscriber video terminal 121 is connected to the reservation system 100 to send a reservation request when the subscriber desires to establish a network resource (bandwidth) during a desired time span. Reservation system 100 includes an admission module 100A and an execution module 100B. Admission module 100A may be physically located in the same reservation system with the execution module 100B if a centralized topology is employed or multiple admission modules may be provided in different location if a distributed topology is advantageous. Separation of the system into the admission module 100A and the execution module 100B allows the system to flexibly increase its capability according to traffic demands to ensure that necessary actions be executed at correct timing.

Admission module 100A includes an interface 101, an admission controller 102 and databases 103 and 104 for storing reservation requests and network resources, respectively. A reservation request from a subscriber network contains a circuit identifier (ID) that specifies the circuit used by the subscriber, a date or dates, start and end times of a desired reservation time span, and a bandwidth value in bps (bits per second) desired. Each reservation request is received at the interface 101 and coupled to the admission controller 102, which in response verifies the request as to the validity of the request and the availablity of the resource by accessing databases 103 and 104.

As shown in FIG. 2A, the reservation request database 103 has multiple entries corresponding to requests. Each entry contains fields for storing request ID, circuit ID, link ID, time-of-day data indicating the timing for starting and ending the request and data indicating the amount of bandwidth required. For example, a reservation request of ID=1 has requested a bandwidth of 45 Mbps for a circuit ID=30 that comprises cascaded links of IDs=1, 3, 10 and 11 for August 10 during a time span beginning at 10:00 and ending at 13:00. Some of the links may be shared by more than one subscriber. For example, the link of ID=3 is shared by subscribers that transmitted requests with ID=1 and ID=2.

In FIG. 2B, the network resource database 104 includes a first table 104A for mapping relationships between the circuit ID of a subscriber and link ID's specifying a set of links comprising the circuit assigned to the subscriber network, and a second table 104B that associates links and their maximum usable bandwidths.

Execution module 100B has a link controller 105, a control data memory 106, a timing manager 107 and a link monitor 108. Timing manager 107 is connected to the request database 103 to obtain timing information therefrom, establish various timing events and instructs the link controller 105 to initiate a particular action for the request at an appropriate instant of time. The timing events may include start time for initiating allocation of reserved bandwidth to a subscriber, standby timing for preparing bandwidth allocation, and end time for clearing established links and erasing reserved requests.

In cases where different reservations share the same link at during mutually exclusive times, the link monitor 108 allows link controller 105 to guarantee that, at the start time of the next reservation, the link occupied by the previous reservation has been completely cleared. As a result, there is no need to provide a timing margin between reservations, and hence, network resource utilization can be improved.

Control data memory 106 is associated with the link controller 105 to store the data necessary to control the SLT 111 which has been converted from the data contained in reservation requests. As shown in FIG. 2C, the control data memory 106 associates the circuits of subscribers with reserved bandwidths. Link monitor 108 is connected to the SLT 111 to monitor the usage of its links and informs the link controller 105 of the status of the links.

The operation of admission controller 102 and link controller 105 will be described with reference to FIGS. 3A, 3B, 3C and 3D.

In response to a reservation request from video terminal 121 (block 300), flow proceeds to block 301 where the admission controller 102 checks the start time of the request to see if it is past the current time. If the user has erroneously input past timing data, it is determined that the request cannot be executed and flow proceeds from block 302 to block 308 where the unit 102 notifies the user of denial of the request.

If the start time is a future time, flow proceeds to block 303 where the admission controller 102 searches the resource database 104 with the circuit ID of the request to determine the identities of user's links and then searches the request database 103 for the previously stored requests of the user. Using the identifiers of the links, the unit 102 determines the amount of bandwidth remaining in the links and compares the requested bandwidth with the remaining bandwidth. Exit then is to decision block 304 where the admission controller 102 determines whether the requested bandwidth is equal to or smaller than the remaining bandwidth. If the requested bandwidth is greater than the remaining bandwidth, flow proceeds from block 304 to block 309 to inform the user of denial of the request and of the remaining bandwidth. If the requested bandwidth is equal to or smaller than the remaining bandwidth, flow proceeds to block 305 where the admission controller 102 assigns an identifier to the request and stores the data contained in the request into the reservation request database 103 and, in block 306, notifies the user of grant of the request.

Flow proceeds to block 307 where the admission controller 102 applies the request data to the link controller 105 to indicate that a verification process has been completed. In response, the control unit 105 converts the request data into link control data and stores it into the control data memory 106. On executing block 307,308 or 309, flow returns to block 300 to repeat the process for a next reservation request which may be transmitted from the same subscriber network or a different subscriber network.

Figure 3B:
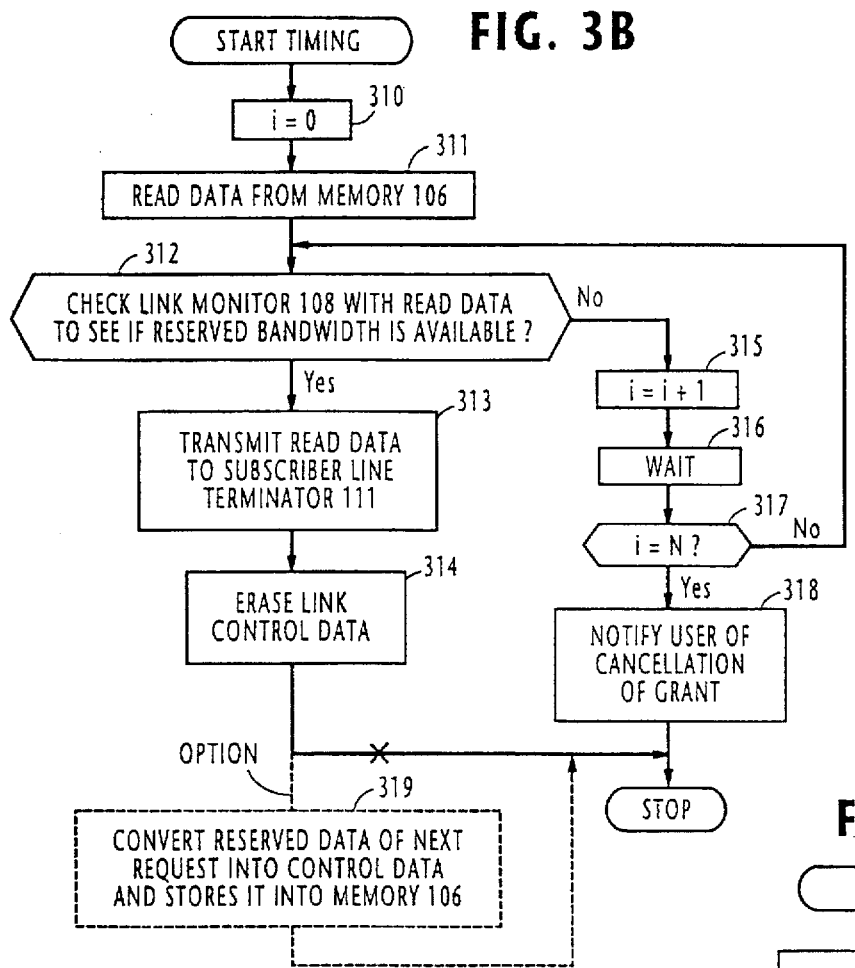

If the start time of a request reserved in the database 103 is reached, the timing manager 107 enables the link controller 105 to initiate an execution of the reserved request. As shown in FIG. 3B, the link controller 105 starts with block 310 where it initializes a variable "i" to zero and proceeds to block 311 to read control data from memory 106 corresponding to the subscriber's circuit. Exit then is to decision block 312 where the link controller 105 checks the link monitor 108 using the read data to see if the reserved bandwidth is actually available. If some of the channels of the reserved bandwidth have been temporarily or permanently failed, it is concluded that the request cannot be met and flow proceeds from block 312 to block 315 to increment the variable by one and waits, in block 316, a predetermined period of time. At the end of this period, flow proceeds to block 317 to determine whether i=N. If not, flow returns to block 312 to check the link monitor 108 again for bandwidth availability until i=N. If i=N, it is determined that the requested bandwidth cannot be allocated to the user and flow proceeds from block 317 to block 318 where the link controller 105 notifies the user of cancellation of the reserved request through the admission controller 102.

If it is determined that the requested bandwidth is actually available, flow proceeds from block 312 to block 313 where the link controller 105 transmits the control data to the SLT 111, whereby a circuit with a transmission speed corresponding to the reserved bandwidth is established in the SLT 111. Following the establishment of the circuit, flow proceeds to step 314 to erase the link control data from memory 106, and then returns to the end of routine. The removal of the link control data from memory 106 advantageously vacates its storage areas for storing control data of other reservations.

As a first option, block 307 of FIG. 3A is executed when standby timing is established by the timing manager 107 before executing the start time routine of FIG. 3B, rather than following the execution of block 306. This allows the admission controller 102 to return to the starting point of the program to quickly attend to the next reservation request.

As a second option, flow proceeds from block 313 of FIG. 3B to block 319, rather than to the end of routine, where the link controller 105 converts reserved data of the next user into control data and stores it into control memory 106. This allows transactions for different users to be interleaved with each other to speed up the data processing.

If a requesting user gives a second thought to the request already granted and desires to cancel it, a cancellation request containing the same start time data as that of the reservation request is transmitted to the reservation system 100. In response to this request, the admission controller 102 starts an operation, in block 320, as illustrated in the flowchart of FIG. 3C, and in block 321, it checks to see if the start time has already past the current time. If not, flow proceeds to block 323 where the reserved request data of the user is erased from the database 103. If the start time of the cancellation request has already past the current time, flow proceeds to block 324 to notify the user of denial of the cancellation request.

Figure 3D:
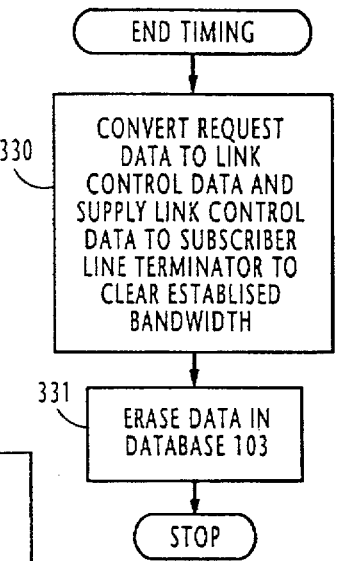
Figure 3C:
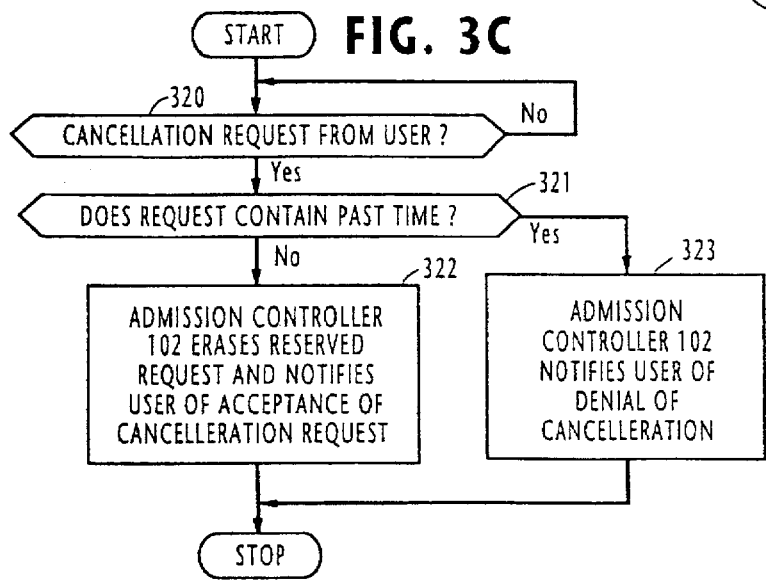

When the end time of a request reserved in database 103 is reached, the timing manager 107 instructs the link controller 105 to initiate an end-timing-operation illustrated in the flowchart of FIG. 3D by converting the request data into link control data again and supplying it to SLT 111 to clear the established bandwidth. In block 331, the reservation data of the request in database 103 is erased.

Figure 4:
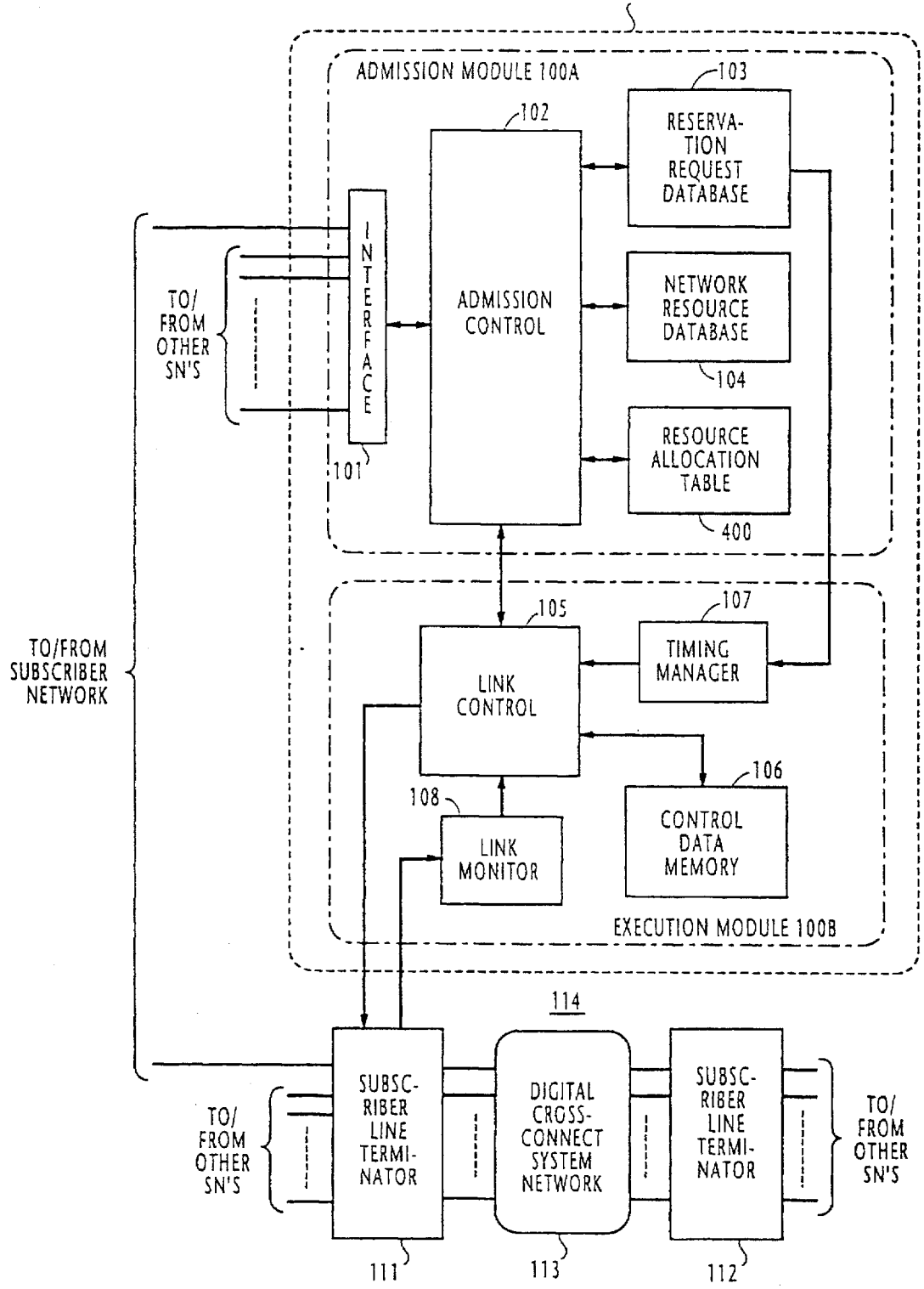
FIG. 4 is a block diagram of a leased-line communication system with a centralized reservation facility modified according to the present invention.

In order to facilitate the bandwidth check, a resource allocation table 400 is provided which is connected to the admission controller 102 as shown in FIG. 4. As illustrated in detail in FIG. 5A, the resource allocation table 400 includes entries corresponding to link identifiers. Each entry is divided into multiple fields corresponding to time slots (e.g., time-of-day intervals) for storing data representing bandwidths available during the respective time-of-day (TOD) slots. Data representing the maximum bandwidth of each link is initially stored into each field of the link entry.

Figure 6A:
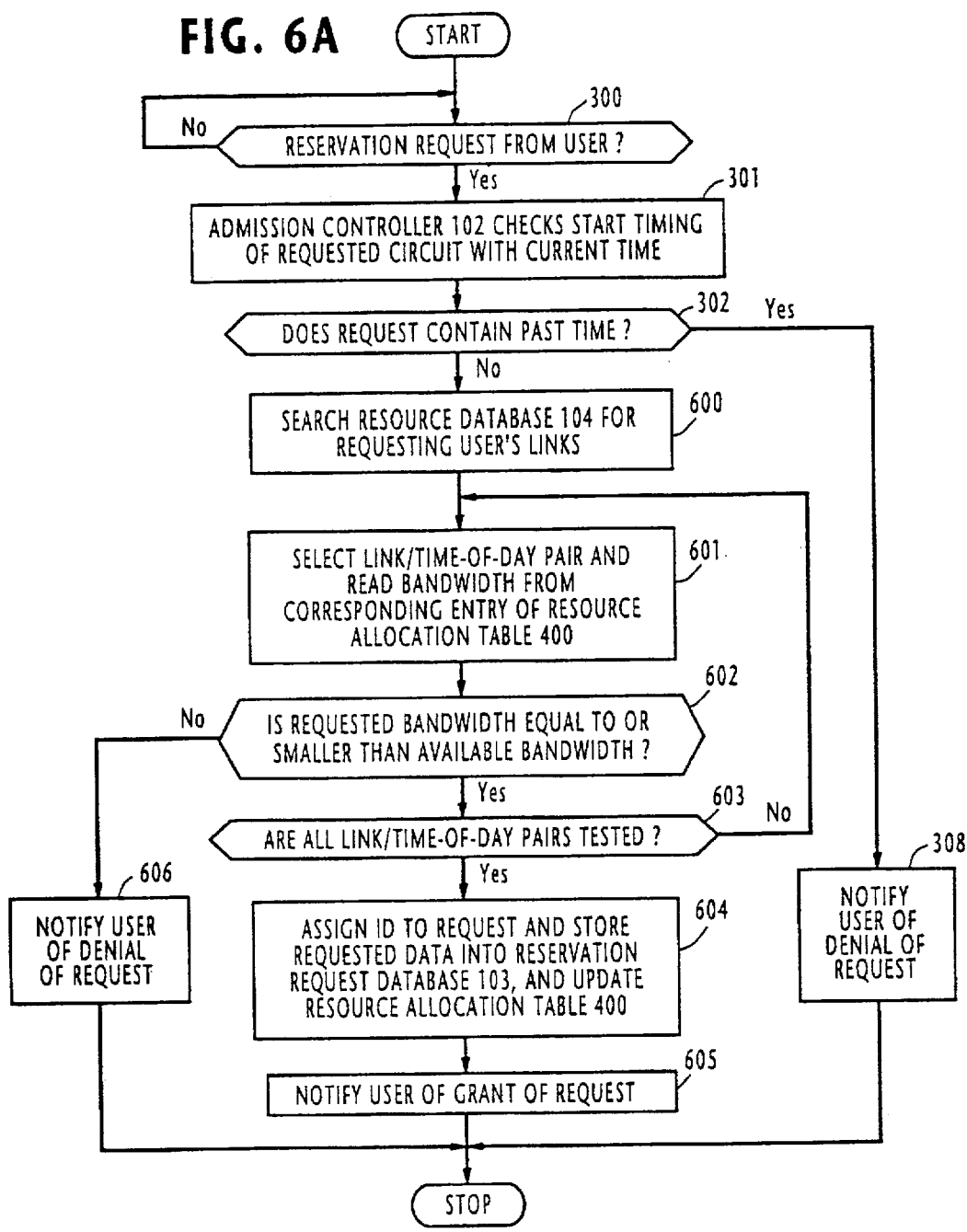
FIGS. 6A and 6B are flowcharts associated with the FIG. 4 embodiment.

The operation of the admission controller 102 of FIG. 4 proceeds according to the flowchart of FIG. 6A in which blocks corresponding to those in FIG. 3A are marked with the same numerals as those used in FIG. 3A. Following receipt of a reservation request, blocks 300 to 302 are sequentially executed for checking the validity of the request, and flow proceeds to block 600 where the admission controller 102 searches the resource database 104 for the user's links and proceeds to block 601 to select a link/TOD slot pair and read bandwidth data from the corresponding link/field entry of the resource allocation table 400. Flow proceeds to decision block 602 where the unit 102 determines whether the requested bandwidth is equal to or smaller than the available bandwidth. If it is greater than the bandwidth of the allocation table, flow proceeds to block 606 to notify the user of denial of the request.

If the requested bandwidth is equal to or smaller than the bandwidth of the allocation table 400, flow proceeds from block 602 to block 603 where the admission controller 102 checks to see if all link/TOD slot pairs are tested. If not, flow returns to block 601 to repeat the link/TOD slot pair selection and bandwidth checking processes. If all pairs are tested, flow proceeds from block 603 to block 604 where the control unit 102 assigns an identifier to the request and stores the data of the request into reservation database 103, and updates the resource allocation table 400 by subtracting the requested value of bandwidth from the value of each field of the associated link entry. Exit then is to block 605 to notify the user of grant of the request.

Figure 6B:
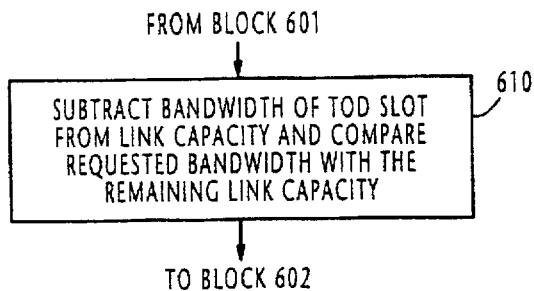

The bandwidth data stored in the allocation table 400 indicates the bandwidths which are currently in use. FIG. 5B illustrates a modified form of the allocation table 400, in which each link entry additionally includes a field storing data indicating the total bandwidth (capacity) of the link. In this modification, the admission controller 102 operates according to the flowchart of FIG. 6B which illustrates block 610 that is executed between blocks 601 and 602. In block 610, the control unit 102 subtracts the bandwidth of TOD slot field from the value of the link capacity field of the link entry of the user and compares the requested bandwidth with the remaining link capacity. By varying the data stored in each total link capacity field according to past demands of users, it is possible to dynamically allocate network resource to a link that supports on-demand traffic.

For asynchronous transmission, the effect of statistical multiplexing must be taken into account to determine the available bandwidth because the required bandwidth will not simply be the mathematical sum of the bandwidths of all individual traffic. Due to the nonlinear statistical multiplexing gain, simple subtraction of reserved bandwidth from the link capacity cannot precisely determine the available bandwidth for asynchronous-mode traffic. Since multiple circuits (virtual channels or virtual paths) of different users will be statistically multiplexed on a single link, maximum and average values of reserved bandwidths are calculated for each of these circuits and stored in each TOD slot of the table 400 as shown in FIG. 5C. For example, it is seen that a link with ID=1 has a capacity of 150 Mbps, and during the 3:00 time slot of August 10, three circuits of 10 Mbps/5 Mbps each (=maximum bandwidth/average bandwidth), one circuit of 50 Mbps/10 Mbps and one circuit of 50 Mbps/30 Mbps are currently reserved. Using the capacity of a link, the data in each TOD slot of the link and the requested bandwidth, the statistical multiplexing gain is calculated according to any of known methods and using the result of the calculation a determination is made on whether or not the requested bandwidth can be met. A typical calculation method for this purpose is described in an article "A Dimensioning Scheme in ATM Networks, Y. Miyao, Networks" 92, May 1992, "Network Planning for an Open Era", pages 171–175.

With the use of the resource allocation table 400, the network resource that can be used for each link can be determined on a fixed time-slot basis. This advantageously speeds up the process for determining the availability of network resource to each reservation request.

Figure 7:
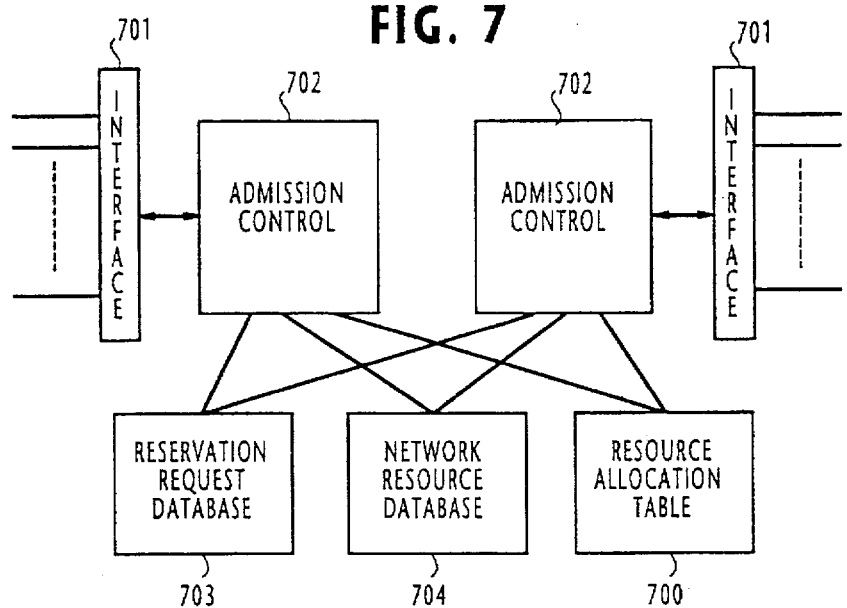
FIGS. 7 and 8 show modified forms of the admission module.
Figure 8:
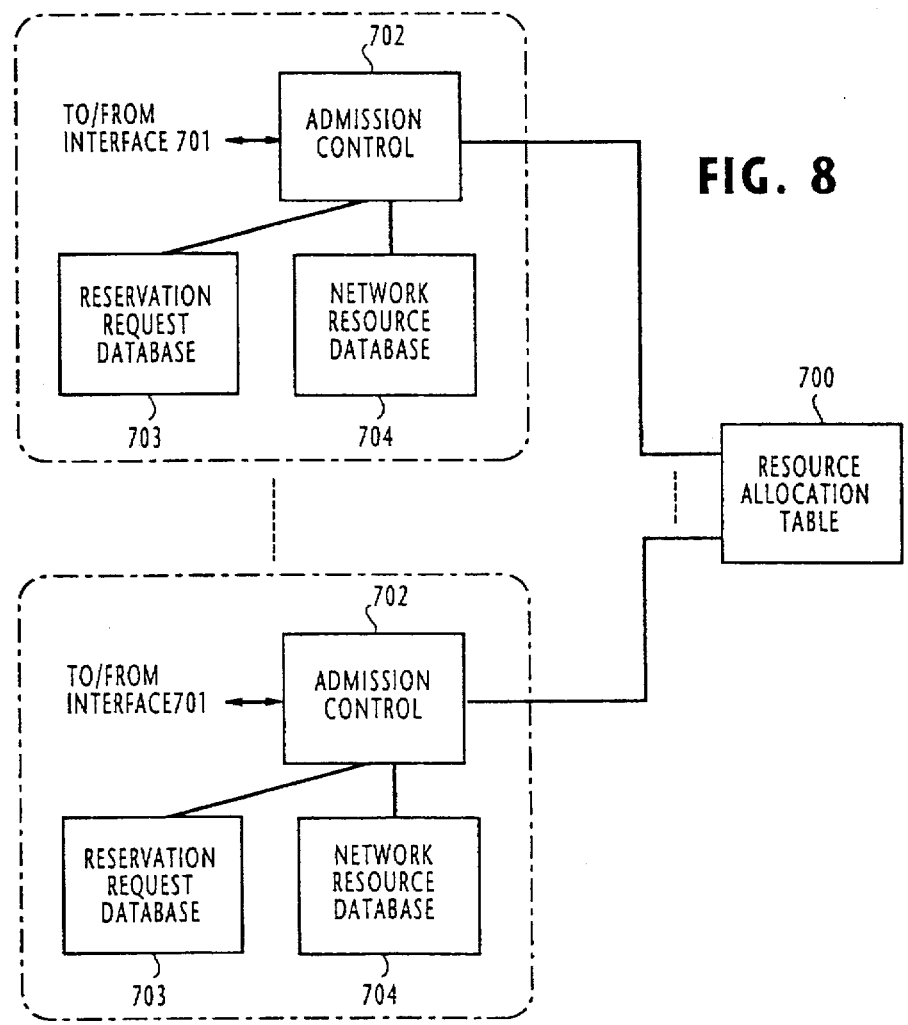

In a modified embodiment, admission control may be provided by separate admission controllers 702 as illustrated in FIG. 7 for serving different groups of subscriber networks through interfaces 701. There is provided a single set of reservation request database 703, network resource database 704 and resource allocation table 705 which are commonly accessed by the admission controllers 702. In a further modification, the resource allocation table 700 is commonly accessed by separate admission controllers 702, while a set of databases 703 and 704 are individually accessed as shown in FIG. 8. In FIGS. 7 and 8, there is a probability of more than one admission controller 702 accessing the single resource allocation table 700 at the same time. In such instances, exclusive lockout control is necessary for each admission controller to prevent the other admission controller or controllers from accessing a field of the table 700 when this field is being accessed first by the controller for rewriting its contents.

Figure 9:
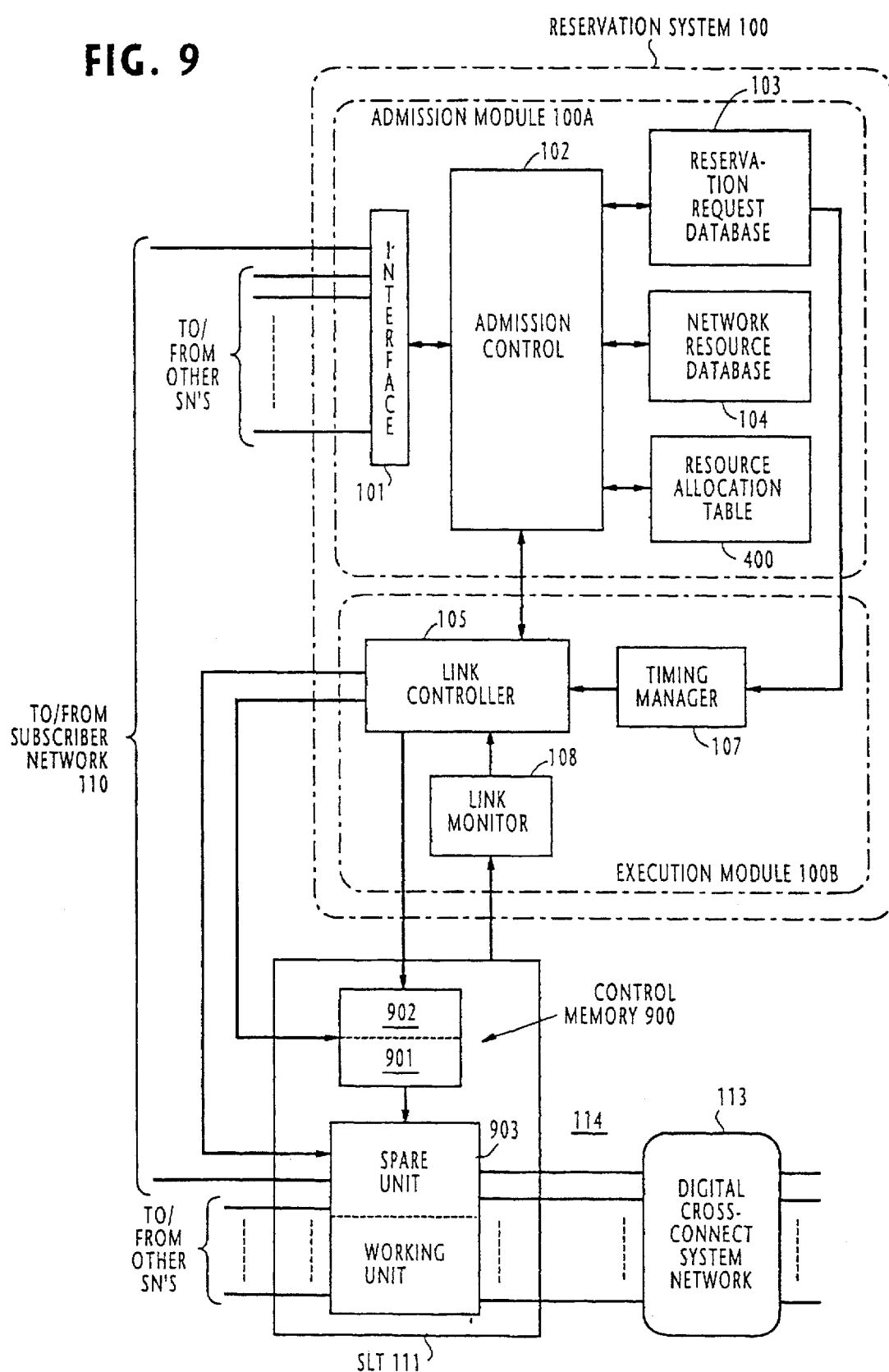
FIG. 9 is a block diagram of a leased-line communication system with a centralized reservation facility further modified according to the present invention.

Instead of the control data memory 106, a memory unit 900 is provided in the SLT 111 as shown in FIG. 9. This memory unit is divided into a first memory 901 and a second memory 902. The subscriber line terminator 111 has an interconnection switch 903 which is divided into a working unit and a spare unit. The working and spare units are normally coupled to the first and second memories. The working unit operates according to the link control data contained in the first memory 901 to establish required links. The operation of the link controller 105 of this embodiment proceeds according to the flowchart of FIGS. 10A and 10B.

Figure 10A:
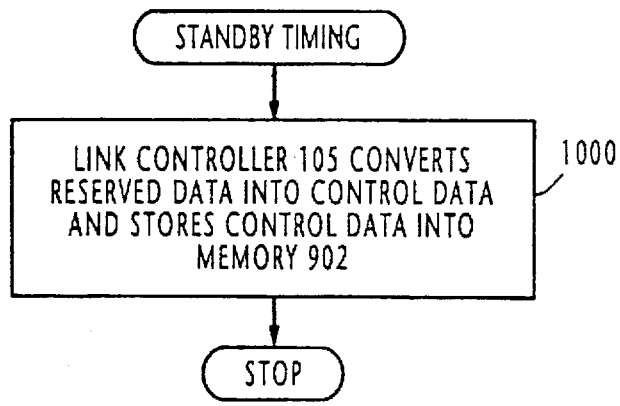
FIGS. 10A and 10B are flowcharts associated with the FIG. 9 embodiment.
Figure 10B:
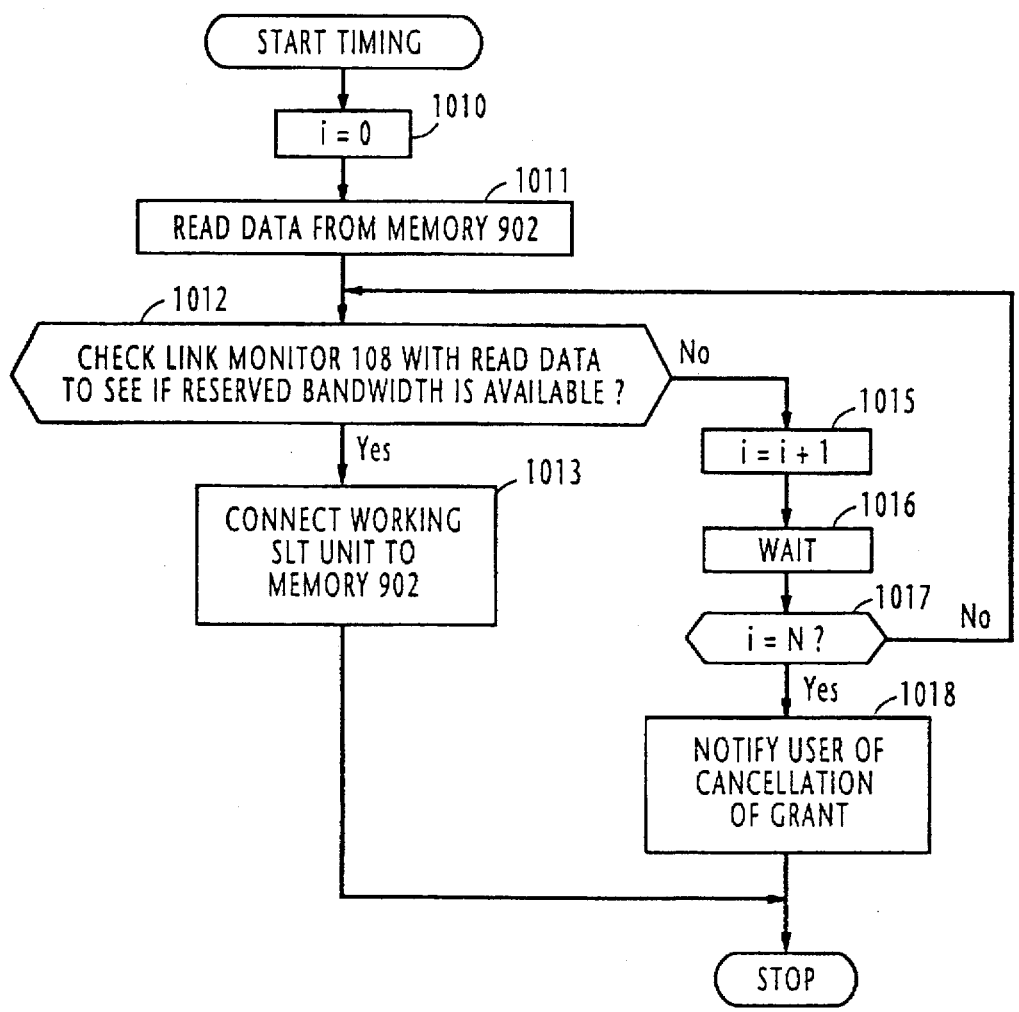

In FIG. 10A, when the standby timing of a reserved request is initiated, link controller 105, in block 1000, converts the request data in the database 103 into control data and stores it into the second memory 902 usually associated with the spare unit of switch 903. In response to the start time of the reservation (FIG. 10B), link controller 105 initializes variable "i" to zero (block 1010) and proceeds to block 1011 to read the stored data from memory 902. In decision block 1012, the link controller checks the link monitor 108 with the read data to see if the reserved bandwidth is available. If it is, flow proceeds to block 1013 where the link controller connects the working unit of the switch 903 to the second memory 902. A circuit of reserved bandwidth is thus established in the SLT 111 in accordance with the link control data stored in the second memory 902. Since the switching of the working unit to the second memory 902 can be performed instantly for a new circuit, all the other circuits are not affected when the network is reconfigured. Following the establishment of the circuit, the link controller terminates the start time events. If the decision at block 1012 is negative, flow proceeds through blocks 1015, 1016, 1017 and 1018 to inform the user network of cancellation of grant.

Figure 11:
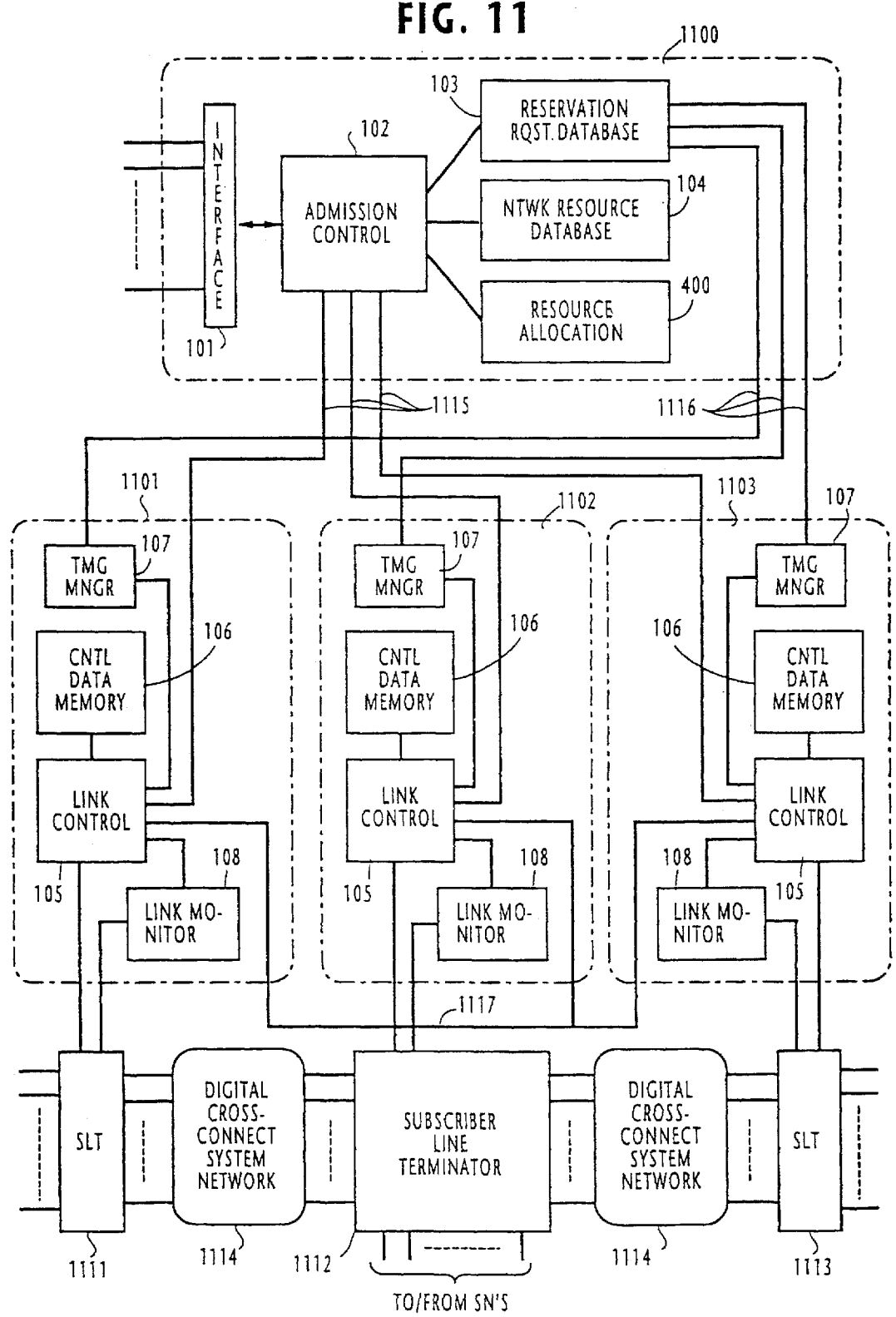
FIG. 11 is a block diagram of a modified embodiment of the present invention in which an admission module is connected to multiple execution modules.

FIG. 11 shows a distributed reservation system comprising an admission module 1100 connected to a plurality of execution modules 1101, 1102 and 1103 which are associated respectively with subscriber line terminators 1111, 1112 and 1113 interconnected by DCS networks 1114. The link controller 105 of each execution module 1101 to the admission controller 102 via links 1115 and the timing manager 107 of each execution module is connected to the reservation request database 103 through links 1116. Additionally, the link controller of each execution module is connected to the link controller of all the other execution modules through a link 1117 to exchange end-of-reservation messages. When a reserved bandwidth is cleared by the associated SLT, each link controller sends a release-complete message to the other link controllers.

Figure 12:
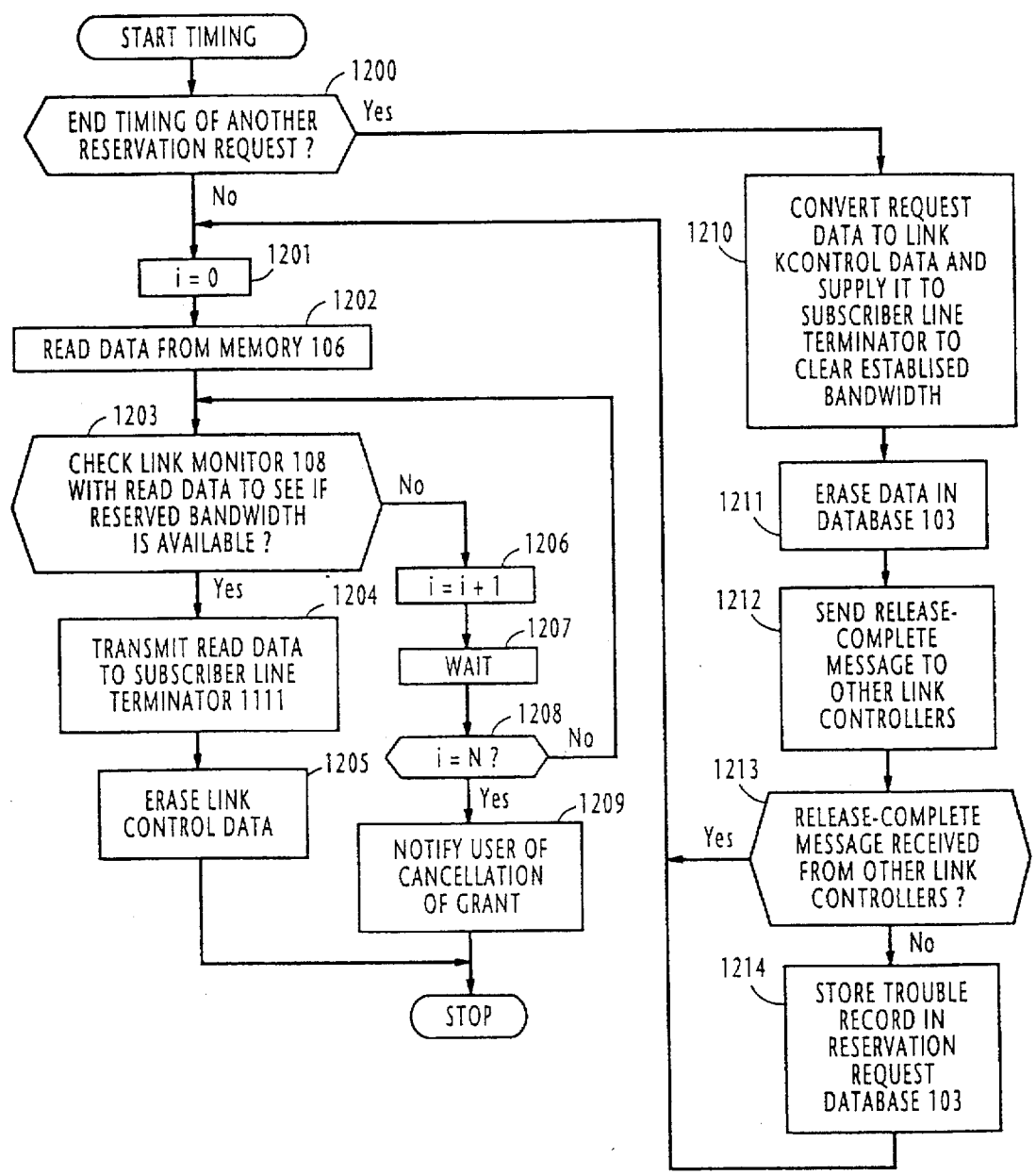
FIG. 12 is a flowchart associated with the embodiment of FIG. 11.

While the operation of the admission controller of FIG. 11 is the same as described previously, the operation of the link controller of each execution module proceeds according to the flowchart of FIG. 12 in response to the start time of a reserved request simultaneously with all the other link controllers. For simplicity, the operation of the link controller of module 1101, for example, will be described as follows.

When the start time of a reservation request is established by the timing manager 107 of module 1101, the operation of the link controller of the module starts with decision block 1200 where the controller determines whether or not the end time of another reservation request is established by the associated timing manager. If there is another request whose reservation period has expired, the clearing of this reservation will be performed in preference over the establishing of a new bandwidth in order to free the network resource as early as possible for accepting new reservation requests. If this is the case, flow proceeds from block 1200 to block 1210 where the link controller reconverts the request data to the link control data and supplies it to the SLT 1111 to clear the bandwidth of the expired reservation. Exit then is to block 1211 where the link controller instructs the admission controller to erase the reservation data of the request from database 103 and flow proceeds to block 1212 to send a release-complete message to the link controller of modules 1102 and 1103 through link 1117 indicating that a reserved bandwidth has been cleared. Flow proceeds to block 1213 to check to see if similar messages have been received from the other link controllers. If not, it is determined that a trouble has occurred in the circuit of the expired reservation and flow proceeds from block 1213 to block 1214 where the link controller stores a record of the trouble into database 103.

If all release-complete messages are received from all the other link controllers, it is determined that there is no trouble in the route of the expired reservation, or if block 1214 has been executed, flow proceeds to block 1201. Additionally, if the decision in block 1200 is negative, flow likewise proceeds to block 1201.

In block 1201, variable "i" is initialized to zero and flow advances to block 1202 to read control data from memory 106. The link controller then checks, in block 1203, the associated link monitor 108 using the read control data to see if the reserved bandwidth is actually available. If so, flow proceeds from block 1203 to block 1204 where the link controller transmits the control data to SLT 1111 and flow proceeds to block 1205 to erase the control data of memory 106 and proceeds to the end of the routine.

If the decision in block 1203 is negative, flow proceeds to block 1206 where the link controller increments the variable by one, waits a predetermined period in block 1207, checks to see if i=N (block 1208) and informs the user network of cancellation of grant (block 1209) if "i" is not equal to N.

The foregoing description shows only preferred embodiments of the present invention. Various modifications are apparent to those skilled in the art without departing from the scope of the present invention which is only limited by the appended claims.

What is claimed is:

1. A network resource reservation system for a reconfigurable transmission network which comprises a plurality of parallel circuits each comprising a series of links interconnected by one or more interconnection switches, at least one of the links of one of said circuits being commonly assigned to multiple user networks, each of said user networks transmitting a reservation request indicating a circuit assigned to the user network, a network resource desired to be allocated from the resource of the assigned circuit, and start and end times of a reservation, comprising:

an interface connected to said user networks for receiving said request;

a first database;

a second database for storing resources respectively assigned to said user networks;

an admission controller connected to the interface, the admission controller being responsive to a reservation request received by the interface for accessing said first and second databases, informing the requesting user network from which the request was transmitted that the request is denied if the network resource desired by the request is greater than an amount remaining in the resource assigned to the requesting user network and informing the requesting user network of grant of the request and storing the request into said first database if the desired network resource is equal to or smaller than said amount, said admission controller being responsive to the end time of the stored request for removing the stored request from said first database; and link control means connected to an associated one of said interconnection switches, the link control means being responsive to the start time of the stored request for operating the associated interconnection switch to establish the desired network resource, and responsive to the end time of the stored request for releasing the associated interconnection switch to clear the established network resource.

2. A network resource reservation system for a reconfigurable transmission network which comprises a plurality of parallel circuits each comprising a series of links interconnected by one or more interconnection switches, at least one of the links of one of said circuits being commonly assigned to multiple user networks, each of said user networks transmitting a reservation request indicating a circuit assigned to the user network, a network resource desired to be allocated from the resource of the assigned circuit, and start and end times of a reservation, comprising:

an interface connected to said user networks for receiving said request;

a first database;

a second database for storing network resources respectively assigned to said user networks;

a resource allocation table;

an admission controller connected to the interface, the admission controller being responsive to a reservation request received by the interface for accessing said first and second databases and said resource allocation table, informing the requesting user network from which the request was transmitted that the request is denied if the network resource desired by the request is greater than an amount remaining in the resource assigned to the requesting user network and informing the requesting user network of grant of the request and storing the request into said first database and available network resource of the requesting user network into the resource allocation table if the desired network resource is equal to or smaller than said amount, said admission controller being responsive to the end time of the stored request for removing the stored request from said first database and updating the resource allocation table; and link control means connected to an associated one of said interconnection switches, the link control means being responsive to the start time of the stored request for operating the associated interconnection switch to establish the desired network resource, and responsive to the end time of the stored request for releasing the associated interconnection switch to clear the established network resource.

3. A network resource reservation system as claimed in claim 2, wherein said admission controller includes means for storing time-of-day available network resources respectively remaining in the links of the reconfigurable transmission network into said resource allocation table, and wherein the admission controller performs the functions of:

a) determining associated links for the received requests;

b) selecting one of the determined links c) selecting one of time-of-day intervals which exist between the start and end times of the requests;

d) comparing the desired network resource with a remaining network resource stored in said table corresponding to the selected link; and e) repeating the functions (c) and (d) and determining the availability of the desired network resource when all of said associated links and all the time-of-day intervals are selected.

4. A network resource reservation system for a reconfigurable transmission network which comprises a plurality of parallel circuits each comprising a series of links interconnected by one or more interconnection switches, at least one of the links of one of said circuits being commonly assigned to multiple user networks, each of said user networks transmitting a reservation request indicating a circuit assigned to the user network, a network resource desired to be allocated from the resource of the assigned circuit, and start and end times of a reservation, comprising:

a plurality of interfaces connected to said user networks for receiving said request;

a plurality of first databases;

a plurality of second databases for storing network resources respectively assigned to said user networks;

a resource allocation table;

a plurality of admission controllers connected respectively to the interfaces and further connected respectively to the first databases and to the second databases, each of the admission controllers being responsive to a reservation request received by the interfaces for accessing the associated first and second databases and said resource allocation table, informing the requesting user network from which the request was transmitted that the request is denied if the network resource desired by the request is greater than an amount remaining in the resource assigned to the requesting user network and informing the requesting user network of grant of the request and storing the request into the associated first database and available network resource of the requesting user network into the resource allocation table if the desired network resource is equal to or smaller than said amount, said admission controller being responsive to the end time of the stored request for removing the stored request from the associated first database and updating the resource allocation table; and link control means connected to an associated one of said interconnection switches, the link control means being responsive to the start time of the stored request for operating the associated interconnection switch to establish the desired network resource, and responsive to the end time of the stored request for releasing the associated interconnection switch to clear the established network resource.

5. A network resource reservation system as claimed in claim 4, wherein said admission controller includes means for storing time-of-day available network resources respectively remaining in the links of the reconfigurable transmission network into said resource allocation table, and wherein the admission controller performs the functions of:

a) determining associated links for the received requests;

b) selecting one of the determined links c) selecting one of time-of-day intervals which exist between the start and end times of the requests;

d) comparing the desired network resource with a remaining network resource stored in said table corresponding to the selected link; and e) repeating the functions (c) and (d) and determining the availability of the desired network resource when all of said associated links and all the time-of-day intervals are selected.

6. A network resource reservation system as claimed in claim 2, wherein the resource allocation table is arranged to initially store maximum network resources of the links of the reconfigurable transmission network, wherein said admission controller includes means for subtracting network resources desired by the requests stored in the first database from said maximum network resources to produce time-of-day available network resources, and wherein the admission controller performs the functions of:

a) determining associated links for the received requests;
   b) selecting one of the links;
   c) selecting one of time-of-day intervals which exist between the start and end times of the requests;
   d) comparing the desired network resource with an amount equal to a maximum network resource of the selected link minus a network resource determined by the selected link and the selected time-of-day interval; and
   e) repeating the functions (c) and (d) and determining the availability of the desired network resource when all of said associated links and all the time-of-day intervals are selected.

7. A network resource reservation system for a reconfigurable transmission network which comprises a plurality of parallel circuits each comprising a series of links interconnected by a plurality of interconnection switches, at least one of the links of one of said circuits being commonly assigned to multiple user networks, each of said user networks transmitting a reservation request indicating a circuit assigned to the user network, a network resource desired to be allocated from the resource of the assigned circuit, and start and end times of a reservation, comprising:

an interface connected to said user networks for receiving said request;
   a first database;
   a second database for storing resources respectively assigned to said user networks;
   an admission controller connected to the interface, the admission controller being responsive to a reservation request received by the interface for accessing said first and second databases, informing the requesting user network from which the request was transmitted that the request is denied if the network resource desired by the request is greater than an amount remaining in the resource assigned to the requesting user network and informing the requesting user network of grant of the request and storing the request into said first database if the desired network resource is equal to or smaller than said amount, the admission controller being responsive to the end time of a request stored in the first database for removing the request from said first database; and
   a plurality of link control means connected respectively to said interconnection switches, each of the link control means being responsive to the start time of a request stored in the first database for operating the associated interconnection switch to establish the desired network resource of the stored request, and responsive to the end time of the stored request for releasing the associated interconnection switch to clear the established network resource.

8. A network resource reservation system as claimed in claim 1 or 7, wherein said admission controller includes means for informing the user network of denial of a request if the start time of the request has- past the time of receipt of the request.

9. A network resource reservation system as claimed in claim 4, wherein the resource allocation table is arranged to initially store maximum network resources of the links of the reconfigurable transmission network, wherein said admission controller includes means for subtracting network resources desired by the requests stored in the first database from said maximum network resources to produce time-of-day available network resources, and wherein the admission controller performs the functions of:

a) determining associated links for the received requests;
   b) selecting one of the links;
   c) selecting one of time-of-day intervals which exist between the start and end times of the requests;
   d) comparing the desired network resource with an amount equal to a maximum network resource of the selected link minus a network resource determined by the selected link and the selected time-of-day interval; and
   e) repeating the functions (c) and (d) and determining the availability of the desired network resource when all of said associated links and all the time-of-day intervals are selected.

10. A network resource reservation system as claimed in claim 2 or 4, wherein said admission controller includes means for storing time-of-day available network resources respectively remaining in the links of the reconfigurable transmission network into said resource allocation table.

11. A network resource reservation system as claimed in claim 2 or 4, wherein the resource allocation table is arranged to initially store maximum network resources of the links of the reconfigurable transmission network, wherein said admission controller includes means for subtracting network resources desired by the requests stored in the first database from said maximum network resources to produce time-of-day available network resources.

12. A network resource reservation system as claimed in claim 1, 2, 4 or 7, wherein traffic carried by the established network resource is a statistically multiplexed bit stream of asynchronous transfer mode signals, and wherein the admission controller includes means for determining the availability of the desired network resource by using a statistical multiplexing effect of the traffic.

13. A network resource reservation system as claimed in claim 1, 2, 4 or 7, wherein each of said interconnection switches includes a spare unit and a working unit and first and second memories associated respectively with the spare and working units, wherein said link control means comprises means for producing link control data from the request stored in the first database and storing the link control data in said first memory when the request is granted and transferring the link control data from the first memory to the second memory when the start time of the request is reached.

14. A network resource reservation system as claimed in claim 1, 2, 4 or 7, wherein the link control means includes:

a memory;
   a timing manager for establishing standby timing which is earlier by a predetermined amount than the start time of said request; and
   a controller responsive to the standby timing established by the timing manager for converting the request data in said database into link control data and storing the link control data into said memory and supplying the stored link control data to the associated interconnection switch when the start time of the request is reached to establish the requested network resource, and removing the link control data from said memory when the requested network resource is established.

15. A network resource reservation system as claimed in claim 1, 2, 4 or 7, wherein said link control means includes a link monitor for monitoring the links interconnected by the associated interconnection switch and a controller responsive to the start time of the request for accessing the link monitor to determine whether the network resource of the request can be actually established and informing the user network of cancellation of the request if the network resource of the request is determined to be not establishable.

16. A method for making a reservation of network resource by transmitting a request from a user who desires to establish a network resource in a reconfigurable transmission network which comprises a plurality of parallel circuits each comprising a series of links interconnected by one or more interconnection switches, at least one of the links of one of said circuits being commonly assigned to multiple users, said request indicating a circuit assigned to the user, a network resource desired to be allocated from the resource of the assigned circuit, and start and end timing of a reservation of the desired network resource, comprising the steps of:
 a) determining, in response to a reservation request from a user, whether or not the network resource desired by the request is available in the circuit assigned to the user;
 b) if the desired network resource is determined to be not available, informing said user of denial of the request, and if the desired network resource is determined to be available, storing the request into a database and informing said user of grant of the requests;
 c) producing a link control signal from the stored request and storing the link control signal into a memory;
 d) operating an associated one of the interconnection switches according to the link control signal of said memory to establish the desired network resource when the start timing of the request is reached and removing said link control signal from said memory; and
 e) producing a link control signal again from the stored request and releasing the associated interconnection switch according to the link control signal to clear the established network resource when the end timing of the request is reached and removing the stored request from said database.

17. A method for making a reservation of network resource by transmitting a request from a user who desires to establish a network resource in a reconfigurable transmission network which comprises a plurality of parallel circuits each comprising a series of links interconnected by one or more interconnection switches, at least one of the links of one of said circuits being commonly assigned to multiple users, said request indicating a circuit assigned to the user, a network resource desired to be allocated from the resource of the assigned circuit, and start and end times of a reservation, one of said switches including a working unit and a spare unit and first and second memories, said working unit initially operating according to data contained in the first memory, comprising the steps of:
 a) determining, in response to a reservation request from a user, whether or not the network resource desired by the request is available in the circuit assigned to the user;
 b) if the desired network resource is determined to be not available, informing said user of denial of the request, and if the desired network resource is determined to be available, storing the request into a database and informing said user of grant of the request;
 c) producing a link control signal from the stored request and storing the link control signal into said second memory;
 d) operating said working unit to establish the desired network resource according to the link control signal of said second memory when the start time of the request is reached; and
 e) releasing said working unit according to the link control signal of said second memory to clear the established network resource when the end time of the request is reached.

18. A method for making a reservation of network resource by transmitting a request from a user who desires to establish a network resource in a reconfigurable transmission network which comprises a plurality of parallel circuits each comprising a series of links interconnected by one or more interconnection switches, at least one of the links of one of said circuits being commonly assigned to multiple users, said request indicating a circuit assigned to the user, a network resource desired to be allocated from the resource of the assigned circuit, and start and end times of a reservation, comprising the steps of:
 a) determining, in response to a reservation request from a user, whether or not the network resource desired by the request is available in the circuit assigned to the user;
 b) if the desired network resource is determined to be not available, informing said user of denial of the request and if the desired network resource is determined to be available, informing said user of grant of the request;
 c) operating an associated one of the interconnection switches to establish the desired network resource of the request when the start time of the request is reached:
 d) repeating the steps (a) to (c) to establish a plurality of desired network resources in response to a plurality of reservation requests of successive arrivals;
 e) operating the associated interconnection switch to clear the established network resource of a previous request when the end time of the previous request is reached;
 f) operating the associated interconnection switch to establish the desired network resource of a subsequent request when the start time of the subsequent request is reached simultaneously with the end time of the previous request; and
 g) releasing the associated interconnection switch to clear the established network resource of the subsequent request when the end time of the subsequent request is reached.

19. A method as claimed in claim 16 or 17, wherein the step (c) is performed at standby time which is a predetermined amount of time prior to the time at which the step (d) is performed.

20. A method as claimed in claim 16, 17 or 18, further comprising the step of informing the user of denial of a request if the start time of the request has past the time of receipt of the request.

21. A method as claimed in claim 16, 17 or 18, wherein traffic carried by the established network resource is a statistically multiplexed bit stream of asynchronous transfer mode signals, and wherein the step (a) includes the step of using a statistical multiplexing effect of the traffic to determine the availability of the desired network resource.

22. A method as claimed in claim 16, 17 or 18, wherein a resource allocation table is provided, and the step (a) includes the steps of:
 A) storing network resources remaining respectively in the links of the reconfigurable transmission network during different time-of-day intervals into said table;

B) determining links associated with the user from which the request was transmitted;

C) selecting one of the determined links and one of the time-of-day intervals which exist between the start and end times of the request;

D) comparing the desired network resource with a remaining network resource stored in said table corresponding to the selected link and the selected time-of-day interval; and E) repeating the steps (C) and (D) to determine the availability of the desired network resource when all the links and all the time-of-day intervals are selected.

23. A method as claimed in claim 16, 17 or 18, wherein a resource allocation table is provided, and the step (a) includes the steps of:

A) storing maximum network resources of the links of the reconfigurable transmission network and network resources of the links of the reconfigurable transmission network desired by granted requests during different time-of-day intervals into said table;

B) determining links associated with the user from which the request was transmitted;

C) selecting one of the determined links and one of the time-of-day intervals which exist between the start and end times of the request;

D) comparing the desired network resource with an amount equal to the maximum network resource of the selected link minus a network resource stored in said table corresponding to the selected link and the selected time-of-day interval; and E) repeating the steps (C) and (D) to determine the availability of the desired network resource when all the links and all the time-of-day intervals are selected.

* * * * *